Patented Apr. 7, 1953

2,634,283

UNITED STATES PATENT OFFICE 2,634,283

BIS-TRIORGANOSILYLAMINES

Leo H. Sommer, State College, Pa., assignor to Dow Corning Corporation, Midland, Mich., a corporation of Michigan No Drawing. Application December 13, 1951, Serial No. 261,601

5 Claims. (Cl. 260—448.2)

1

This invention relates to amines which have triorganosilyl groups substituted in the molecule.

In this application Me designates the methyl radical.

In the applicant's copending application entitled "Bis-Triorganosilyl-Substituted Ketones," filed concurrently herewith, it is disclosed how to prepare ketones of the formula

[RMe$_2$Si(CH$_2$)$_n$]CO while in the applicant's copending application entitled "Bis-Triorganosilyl-Substituted Oximes" filed concurrently herewith, it is disclosed how these ketones are converted into the corresponding oximes of the formula

[RMe$_2$Si(CH$_2$)$_n$]$_2$CNOH by reacting the ketone with hydroxylamine hydrochloride.

It is an object of this invention to prepare novel compositions of matter which are useful per se as additives for siloxane polymers and which are useful as intermediates in the preparation of polysiloxanes having amino groups in the molecule.

This invention relates to amines of the formula [RMe$_2$Si(CH$_2$)$_n$]$_2$CHNH$_2$ in which R is a methyl or phenyl radical and $n$ has a value from 2 to 5 inclusive.

The amines of this invention are prepared by reducing the corresponding oximes shown above with lithium aluminum hydride, LiAlH$_4$. The reaction proceeds smoothly at room temperature and is best carried out in the presence of a solvent such as diethylether. Anhydrous conditions should be maintained through the reaction. If desired, the mixture may be heated at reflux during the last stages of the reaction.

The following examples are illustrative only and are not to be construed as limiting the invention which is properly set forth in the appended claims.

*Example 1*

19 grams of lithium aluminum hydride was added to dry ether and the solution was stirred overnight. 122 grams of the oxime

[Me$_3$Si(CH$_2$)(CH$_2$)$_2$]$_2$CNOH in 500 ml. of dry ether was then added to the hydride solution with stirring at room temperature. The addition required 2½ hours and at the end of this time the reaction mixture was heated at reflux for an additional ½ hour. 75 ml. of methanol was then added dropwise and this was followed by 300 ml. of a 25 per cent solution of

2 sodium potassium tartrate. The ether layer was separated and the aqueous layer was extracted 3 times with 15 ml. portions of ether. The ether solutions were combined and dried over anhydrous K$_2$CO$_3$.

The solvent was then removed and the residue fractionated to give the amine 2,2,8,8-tetramethyl-2,8-disila-5-aminononane boiling 115° C. at 15 mm. and having a refractive index of 1.4438 at 20° C. The material was found to have a molar refraction of 76.61, a density at 20° C. of 0.8123 and to contain 25 per cent silicon. The formula of the compound is

[Me$_3$Si(CH$_2$)$_2$]$_2$CHNH$_2$

Several grams of the above amine were dissolved in ether and anhydrous HCl was passed into the solution. Upon evaporation of the ether, a residue was obtained which was recrystallized twice from boiling water. This was the amine hydrochloride which melted at 131° to 131.5° C. and contained 13.3 per cent chlorine.

*Example 2*

When the oximes shown below are reduced with lithium aluminum hydride in accordance with the procedure of Example 1, the corresponding amines shown below are obtained.

| Oxime | Amine Obtained |
|---|---|
| [C$_6$H$_5$Me$_2$Si(CH$_2$)$_2$]$_2$CNOH | [C$_6$H$_5$Me$_2$Si(CH$_2$)$_2$]$_2$CHNH$_2$ |
| [Me$_3$Si(CH$_2$)$_3$]$_2$CNOH | [Me$_3$Si(CH$_2$)$_3$]$_2$CHNH$_2$ |
| [Me$_3$Si(CH$_2$)$_4$]$_2$CNOH | [Me$_3$Si(CH$_2$)$_4$]$_2$CHNH$_2$ |
| [C$_6$H$_5$Me$_2$Si(CH$_2$)$_5$]$_2$CNOH | [C$_6$H$_5$Me$_2$Si(CH$_2$)$_5$]$_2$CHNH$_2$ |

That which is claimed is:

1. An amine of the formula

[RMe$_2$Si(CH$_2$)$_n$]$_2$CHNH$_2$ where R is selected from the group consisting of methyl and phenyl radicals and $n$ has a value from 2 to 5 inclusive.

2. An amine in accordance with claim 1 where $n$ is 2.

3. An amine in accordance with claim 1 where $n$ is 3.

4. An amine in accordance with claim 1 where $n$ is 4.

5. An amine in accordance with claim 1 where $n$ is 5.

LEO H. SOMMER.

No references cited.